United States Patent
Lee et al.

(10) Patent No.: US 11,522,196 B2
(45) Date of Patent: Dec. 6, 2022

(54) ANODE ACTIVE MATERIAL, PREPARATION METHOD THEREFOR, AND NONAQUEOUS LITHIUM SECONDARY BATTERY COMPRISING SAME ANODE ACTIVE MATERIAL, AND PREPARATION METHOD THEREFOR

(71) Applicants: KOREA ELECTROTECHNOLOGY RESEARCH INSTITUTE, Changwon (KR); UNIVERSITY-INDUSTRY COOPERATION GROUP OF KYUNG HEE UNIVERSITY, Yongin (KR)

(72) Inventors: Sang Min Lee, Changwon (KR); Min Sik Park, Suwon (KR); Gum Jae Park, Changwon (KR); Ha Young Lim, Bucheon (KR); Jeong Hee Choi, Busan (KR)

(73) Assignees: KOREA ELECTROTECHNOLOGY RESEARCH INSTITUTE, Changwon (KR); UNIVERSITY-INDUSTRY COOPERATION GROUP OF KYUNG HEE UNIVERSITY, Yongin (KR)

( * ) Notice: Subject to any disclaimer, the term of this patent is extended or adjusted under 35 U.S.C. 154(b) by 279 days.

(21) Appl. No.: 16/763,946

(22) PCT Filed: Nov. 14, 2018

(86) PCT No.: PCT/KR2018/013867
§ 371 (c)(1),
(2) Date: May 13, 2020

(87) PCT Pub. No.: WO2019/098660
PCT Pub. Date: May 23, 2019

(65) Prior Publication Data
US 2020/0395617 A1    Dec. 17, 2020

(30) Foreign Application Priority Data

Nov. 14, 2017    (KR) .................. 10-2017-0151326

(51) Int. Cl.
*H01M 4/62*    (2006.01)
*C01B 25/08*    (2006.01)
(Continued)

(52) U.S. Cl.
CPC ............ *H01M 4/628* (2013.01); *C01B 25/08* (2013.01); *H01M 4/366* (2013.01);
(Continued)

(58) Field of Classification Search
None
See application file for complete search history.

(56) References Cited

U.S. PATENT DOCUMENTS

2019/0010057 A1    1/2019    Shin et al.

FOREIGN PATENT DOCUMENTS

| CN | 105895886 A | 8/2016 |
| KR | 20150057238 A | 5/2015 |

(Continued)

OTHER PUBLICATIONS

Search Report for International Application No. PCT/KR2018/013867 dated May 27, 2019.

*Primary Examiner* — Sarah A. Slifka

(57) ABSTRACT

The present invention relates to an anode active material, a nonaqueous lithium secondary battery comprising the same, and a preparation method therefor, and the purpose of the present invention is to improve high-rate charging characteristics without deterioration of charging and discharging efficiency and lifetime characteristics when applying an amorphous carbon coating layer as the anode active material of the nonaqueous lithium secondary battery, wherein the (Continued)

amorphous carbon coating layer comprising MoPx particles composed of MoP and MoP$_2$ is formed on the surface of a carbon-based material, thereby reducing resistance when intercalating lithium ions into the surface of the carbon-based material, and improving reactivity and structural stability of the surface. The anode active material according to the present invention comprises a carbon-based material, and an amorphous carbon coating layer comprising MoPx particles composed of MoP and MoP$_2$ formed on the surface of the carbon-based material.

18 Claims, 20 Drawing Sheets

(51) Int. Cl.
*H01M 4/36* (2006.01)
*H01M 4/58* (2010.01)
*H01M 4/587* (2010.01)
*H01M 10/0525* (2010.01)
*H01M 4/02* (2006.01)

(52) U.S. Cl.
CPC ......... *H01M 4/5805* (2013.01); *H01M 4/587* (2013.01); *H01M 10/0525* (2013.01); *C01P 2002/72* (2013.01); *C01P 2002/85* (2013.01); *C01P 2004/03* (2013.01); *C01P 2004/04* (2013.01); *C01P 2004/80* (2013.01); *C01P 2006/40* (2013.01); *H01M 2004/027* (2013.01)

(56) References Cited

FOREIGN PATENT DOCUMENTS

| KR | 20150103841 A | 9/2015 |
| KR | 20160038540 A | 4/2016 |
| KR | 20160059096 A | 5/2016 |
| KR | 20160059100 A | 5/2016 |
| KR | 20170085447 A | 7/2017 |

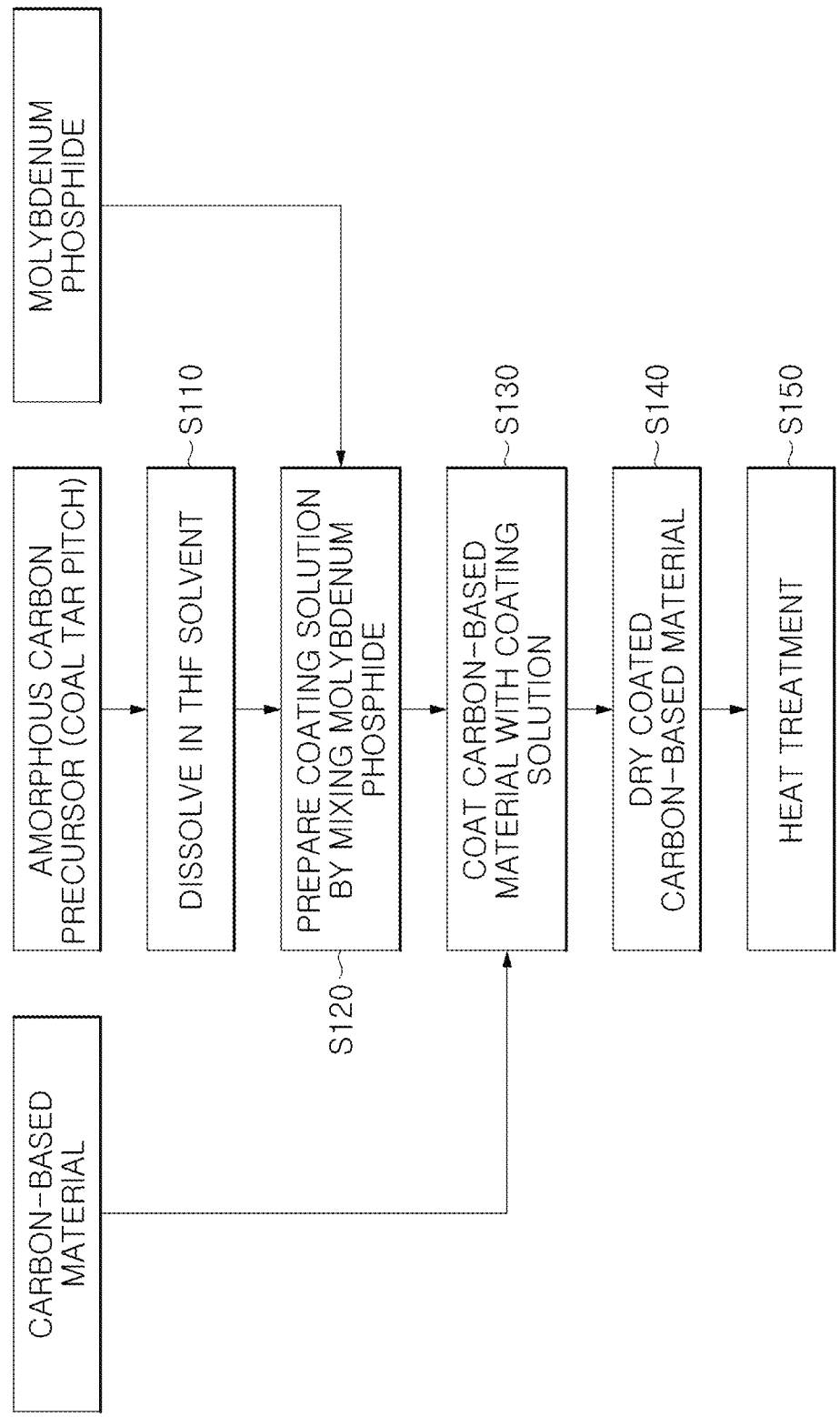

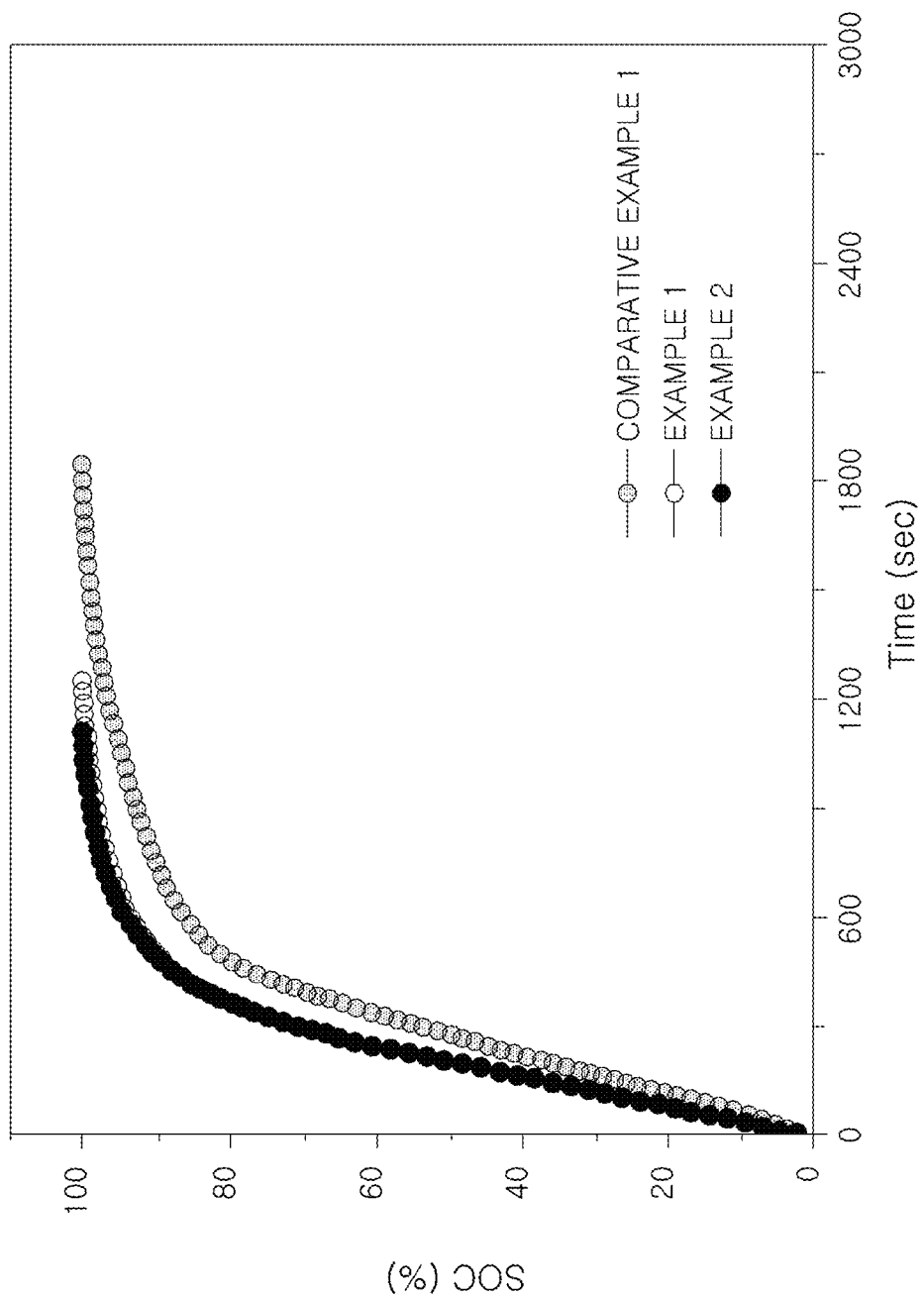

FIG. 11C
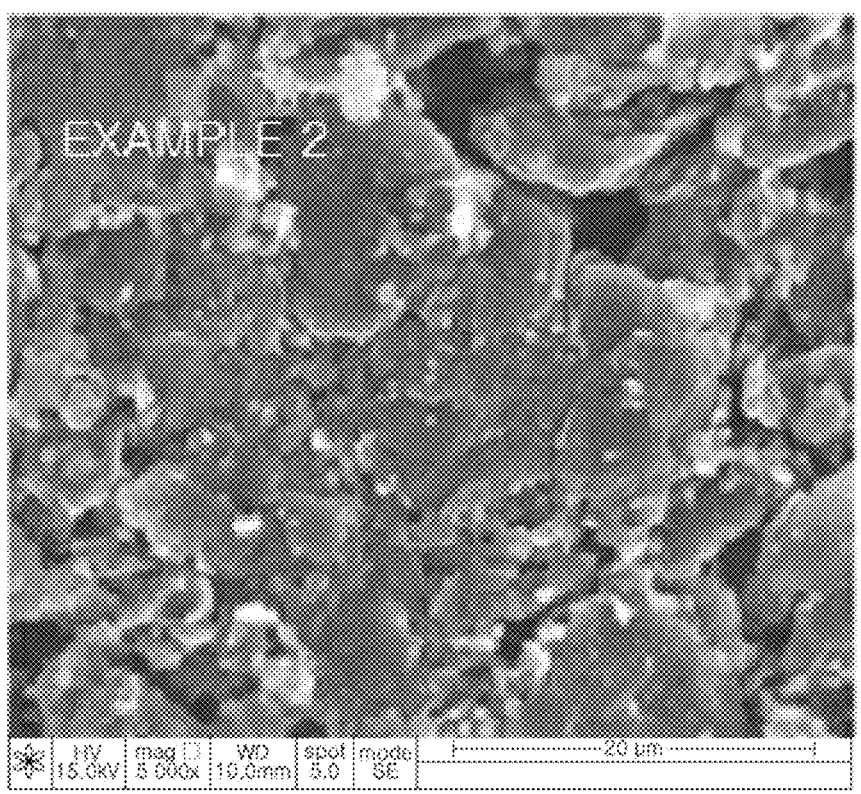
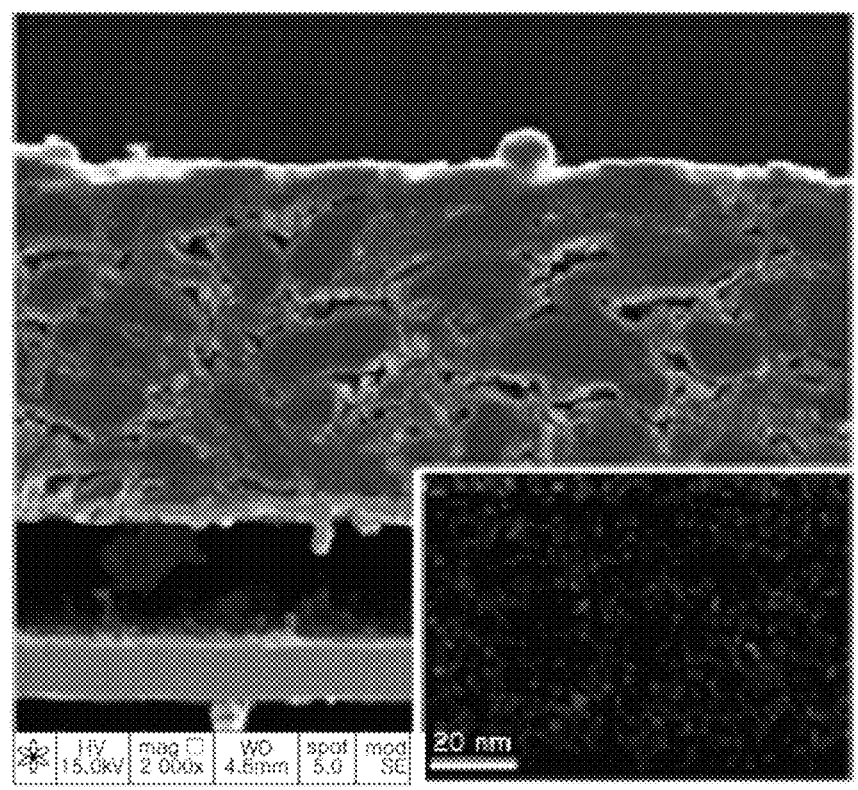

ANODE ACTIVE MATERIAL, PREPARATION METHOD THEREFOR, AND NONAQUEOUS LITHIUM SECONDARY BATTERY COMPRISING SAME ANODE ACTIVE MATERIAL, AND PREPARATION METHOD THEREFOR

TECHNICAL FIELD

The present invention relates to a quick charging nonaqueous lithium secondary battery and a preparation method therefor, and more particularly, to an anode active material in which an amorphous carbon coating layer is formed on the surface of a carbon-based material applied as an anode active material of a lithium secondary battery, a nonaqueous lithium secondary battery including the same, and a preparation method therefor.

BACKGROUND ART

With the spread of portable small electric and electronic devices being distributed globally, new secondary batteries such as nickel hydrogen batteries and lithium secondary batteries have been actively developed.

Among them, a lithium secondary battery is a battery using metal lithium as an anode active material and a nonaqueous solvent as an electrolyte. Since lithium is a metal having a very high ionization tendency, high voltage expression is possible, so that a battery having a high energy density has been developed. A lithium secondary battery using lithium metal as an anode active material has been used as a next-generation battery over a long period of time.

When a carbon-based material is applied as an anode active material to the lithium secondary battery, the decomposition reaction of the electrolyte occurs during charging and discharging because the charge and discharge potential of lithium is lower than the stable range of the existing nonaqueous electrolyte. For this reason, a film is formed on the surface of the carbon-based anode active material. That is, before lithium ions are intercalated into a carbon-based material, an electrolyte is decomposed to form a film on the surface of an electrode, and the film has a property of passing lithium ions, but has a property of blocking the movement of electrons, so that once the film is formed, the decomposition of the electrolyte caused by the movement of electrons between the electrode and the electrolyte is suppressed, and only lithium ions can be selectively intercalated and de-intercalated. The film as described above is called SEI (Solid Electrolyte Interface or Solid Electrolyte Interphase).

For this reason, the resistance generated on the surface of the carbon-based material in the process of intercalating lithium ions into the carbon-based material during charging is very high, so that precipitation of lithium metal occurs during high-rate charging, which is indicated as a fundamental cause for low charging and discharging efficiency and deterioration of lifetime characteristics during a high-rate charging of the current lithium secondary battery to which a carbon-based material is applied as an anode active material.

In order to solve these problems, methods of improving the mobility of lithium ions through physical or chemical surface modification of a carbon-based anode active material have been proposed so as to secure high-rate charging characteristics of a nonaqueous lithium secondary battery to which the carbon-based material is applied. However, such surface modification can improve the lifetime characteristics, but cannot solve the problems of precipitation of lithium metal and reduction of capacity, high-rate characteristics, and charging and discharging efficiency.

Therefore, studies have been conducted on the formation of a functional coating layer for reducing the resistance generated during high-rate charging on the surface of a carbon-based material by various methods and suppressing the precipitation of lithium metal, but no technology of suppressing the precipitation of lithium metal during high-rate charging has yet been developed.

DISCLOSURE

Technical Problem

Therefore, an object of the present invention is to provide an anode active material which reduces the resistance generated when intercalating lithium into the surface of a carbon-based material by introducing an amorphous carbon coating layer including a metal phosphide into the surface of the carbon-based material, may secure high-rate charging characteristics without deterioration of charging and discharging efficiency and lifetime characteristics when applied as an anode active material of a nonaqueous lithium secondary battery by improving high-rate charging characteristics through suppression of precipitation of lithium metal, and has improved high-rate charging characteristics.

Further, another object of the present invention is to provide a nonaqueous lithium secondary battery including the above-described anode active material.

In addition, still another object of the present invention is to provide a method for preparing the above-described anode active material.

Technical Solution

In order to achieve the technical object, the present invention provides an anode active material for a nonaqueous lithium secondary battery, including: a carbon-based material; and an amorphous carbon coating layer including a metal phosphide formed on the surface of the carbon-based material.

In the present invention, the metal of the metal phosphide may include at least one selected from the group consisting of Mo, Ni, Fe, Co, Ti, V, Cr, and Mn.

In the present invention, when the metal is molybdenum, the molybdenum phosphide may include at least one of compounds consisting of $MoP$, $MoP_2$, $Mo_3P$, $MoP_4$, $Mo_4P_3$, and $Mo_8P_5$.

In the present invention, the coating layer may be a compound containing the $MoP$ and $MoP_2$ particles and amorphous carbon formed on the surface of the carbon-based material through heat treatment of $MoP$ and $MoP_2$ and at least one material selected from the group consisting of coal tar pitch, petroleum coke, plastic resins, and pyrocarbon. An amount of $MoPx$ composed of $MoP$ and $MoP_2$ in the coating layer is preferably 50 wt % or less.

In the present invention, the anode active material preferably has a characteristic peak in the vicinity of $2\theta=32.0°$ and $43.0°$ in an X-ray diffraction pattern.

Further, in the present invention, the anode active material preferably has a characteristic peak in the vicinity of $2\theta=23.9°$, $29.5°$, and $41.7°$ in an X-ray diffraction pattern.

In the present invention, the coating layer may be uniformly or partially formed on the surface of the carbon-based material. In addition, the carbon-based material may include at least one selected from the group consisting of artificial graphite, natural graphite, graphitized carbon fiber, graphitized mesocarbon microbeads, petroleum coke, plastic resins, carbon fiber, and pyrocarbon.

In this case, the carbon-based material preferably has a particle size of 20 μm or less.

In order to achieve another technical object, the present invention provides a nonaqueous lithium secondary battery including an anode including the above-described anode active material.

In addition, in order to achieve still another technical object, the present invention provides a method for preparing an anode active material for a nonaqueous lithium secondary battery, the method including: preparing a carbon-based material; and forming an amorphous carbon coating layer including a metal phosphide on the surface of the carbon-based material.

In the present invention, the forming of the amorphous carbon coating layer may include: coating the surface of the carbon-based material with an amorphous carbon precursor solution containing the metal and P by mixing the amorphous carbon precursor solution with the carbon-based material; drying the carbon-based material coated with the amorphous carbon precursor solution; and forming an amorphous carbon coating layer containing molybdenum phosphide by heat-treating the dried carbon-based material.

The metal may include at least one selected from the group consisting of Mo, Ni, Fe, Co, Ti, V, Cr, and Mn.

In the present invention, the amorphous carbon precursor may include at least one selected from the group consisting of coal tar pitch, petroleum coke, plastic resins, and pyrocarbon.

Further, in the coating step, Mo and P contained in the amorphous carbon precursor may be molybdenum phosphide.

In addition, when the metal is molybdenum, the metal phosphide may include at least one of compounds consisting of MoP, $MoP_2$, $Mo_3P$, $MoP_4$, $Mo_4P_3$, and $Mo_8P_5$.

Preferably, in the present invention, the molybdenum phosphide may be a mixture of MoP and $MoP_2$, the amorphous carbon precursor solution may be a coal tar pitch solution, and the molybdenum phosphide may be included in an amount of 0 to 50 wt % in the amorphous carbon precursor solution.

In the present invention, the drying step may be performed at room temperature to 100° C., and the heat-treatment step may be performed in an inert gas atmosphere at 500 to 1,000° C. for 1 to 10 hours.

Advantageous Effects

According to the present invention, more stable high-rate charging characteristics can be induced on the surface of a carbon-based material by forming an amorphous carbon coating layer including a phosphide such as MoP and $MoP_2$ on the surface of the carbon-based material used as an anode active material of a nonaqueous lithium secondary battery.

Moreover, high-rate charging characteristics can be improved without deterioration of lifetime characteristics by reducing the resistance generated on the surface of the anode active material through a surface coating layer when applying the anode active material as an anode active material of a nonaqueous lithium secondary battery.

DESCRIPTION OF DRAWINGS

FIG. 1 is a flowchart schematically illustrating the process of preparing an anode active material for a nonaqueous lithium secondary battery, in which an amorphous carbon coating layer including molybdenum phosphide particles such as MoP and $MoP_2$ is formed according to an exemplary embodiment of the present invention.

FIG. 10 is a graph illustrating full cell charging times of nonaqueous lithium secondary batteries using the anode active materials according to the Examples and the Comparative Example of the present invention.

FIGS. 11A to 11C are a series of SEM and EDS photographs of surfaces and cross-sections of an electrode including the anode active material according to Example 2 of the present invention after a full cell lifetime evaluation of the electrode.

BEST MODE

Figure 2A:
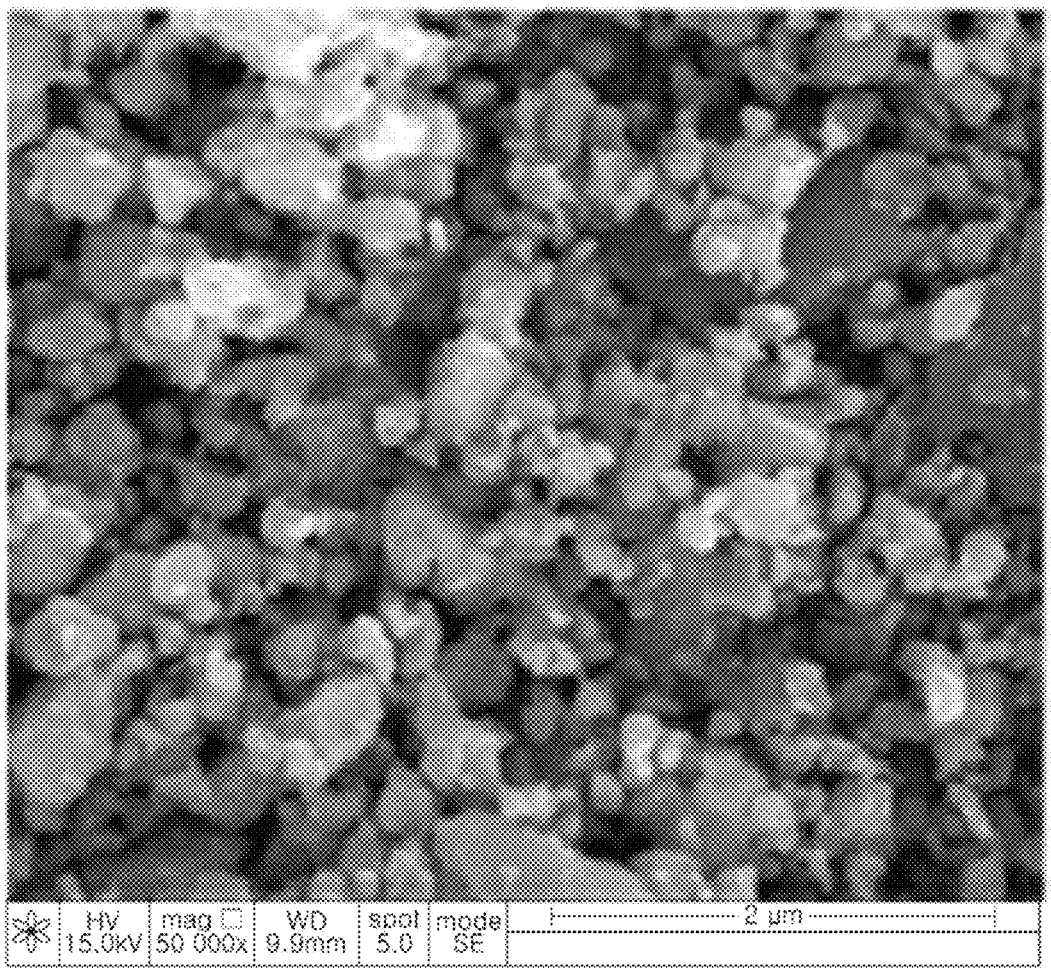
FIGS. 2A to 2F are a series of photographs illustrating anode active materials prepared according to Examples of the present invention.

It is to be noted that in the following description, only the parts necessary for understanding exemplary embodiments of the present invention will be described, and descriptions of the other parts will be omitted so as not to deviate from the gist of the present invention.

Terms or words used in the specification and the claims to be described below should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method. Accordingly, since the exemplary embodiments described in the present specification and the configurations illustrated in the drawings are only preferred exemplary embodiments of the present invention and do not represent all of the technical spirit of the present invention, it is to be understood that various equivalents and modified embodiments, which may replace the exemplary embodiments and the configurations, are possible at the time of filing the present application.

Hereinafter, the exemplary embodiments of the present invention will be described in more detail with reference to the accompanying drawings.

An anode active material for a nonaqueous lithium secondary battery according to the present invention includes a carbon-based material and an amorphous carbon coating layer including an Me-P compound formed on the surface of the carbon-based material.

Here, Me is preferably a transition metal, and may include at least one selected from the group consisting of Mo, Ni, Fe, Co, Ti, V, Cr, and Mn. In the present invention, the Me-P compound may be a binary compound such as M1-P (M1 is a transition metal), or a tertiary compound such as M1-M2-P (M1 and M2 are transition metals) or a compound including a tertiary or higher system. Further, the Me-P compound may include two or more phases having different valences. For example, in the case of Mo, the Mo—P compound may be a compound in which two or more phases selected from compounds composed of MoP, $MoP_2$, $Mo_3P$, $MoP_4$, $Mo_4P_3$, and $Mo_8P_5$ co-exist.

Here, as the carbon-based material, it is possible to use at least one of materials composed of crystalline or amorphous carbon such as artificial graphite, natural graphite, graphitized carbon fiber, graphitized mesocarbon microbeads, petroleum coke, plastic resins, carbon fiber and pyrocarbon. It is preferred to use a carbon-based material having a particle size of 20 μm or less.

The amorphous carbon constituting the coating layer according to the present invention may be derived from at least one of coal tar pitch, petroleum coke, plastic resins, and pyrocarbon by heat treatment.

The molybdenum phosphide may include at least one selected from compounds composed of MoP, $MoP_2$, $Mo_3P$, $MoP_4$, $Mo_4P_3$, and $Mo_8P_5$. Preferably, the molybdenum phosphide includes MoP and $MoP_2$.

As an example, the coating layer in the present invention may include MoPx particles composed of MoP and $MoP_2$. In this case, MoPx particles composed of MoP and $MoP_2$ are present in the form of a compound chemically or physically bound to amorphous carbon. The surface of the carbon-based material may be uniformly coated with the coating layer. Of course, in the present invention, a part of the surface of the carbon-based material may also be locally coated with the coating layer.

In this case, the content of molybdenum phosphide such as MoP and $MoP_2$ in the coating layer is preferably 50 wt % or less, more preferably 30 wt % or less.

Hereinafter, a method for preparing an anode active material of a nonaqueous lithium secondary battery according to embodiments of the present invention will be described.

FIG. 1 is a flowchart schematically illustrating the process of preparing an anode active material for a nonaqueous lithium secondary battery, in which an amorphous carbon coating layer including molybdenum phosphide particles such as MoP and $MoP_2$ is formed according to an exemplary embodiment of the present invention.

Referring to FIG. 1, a carbon-based material, an amorphous carbon precursor, and a material such as MoP and $MoP_2$ as molybdenum phosphide (MoPx) are prepared. The present Example illustrates that molybdenum phosphide as a compound is provided, but the present invention is not limited thereto. For example, various forms of precursors capable of providing Mo and P for forming molybdenum phosphide as a source may also be provided. In the present invention, as the carbon-based material, it is preferred to use a carbon-based material having an average particle size (particle size) of 20 μm or less. As the carbon-based material, various materials can be used, but it is preferred to use a graphite-based material in consideration of a combination with amorphous carbon including molybdenum phosphide such as MoP and $MoP_2$.

Next, an amorphous carbon precursor solution is prepared by dissolving an amorphous carbon precursor such as coal tar pitch in a THF solvent (S110). In this case, after coal tar pitch and the THF solution are dissolved at a volume ratio of 1:3, an amorphous carbon precursor solution may be prepared.

In the present invention, various materials may be used as the amorphous carbon precursor. Petroleum coke, plastic resins, and pyrocarbon are another example of the amorphous carbon precursor.

Subsequently, a coating solution is prepared by mixing molybdenum phosphide with the amorphous carbon precursor solution (S120). In this case, it is preferred that the molybdenum phosphide is mixed so as to be included in an amount of 10 to 15 wt % in the total solution.

Next, the carbon-based material is coated with the prepared coating solution (S130), and the coated carbon-based material is dried (S140).

The drying may be performed at a temperature of room temperature to 100° C., and for example, the drying may be performed at 100° C. for 2 hours.

Next, in step S150, the anode active material according to the present invention may be obtained by heat-treating the dried carbon-based material to form an amorphous carbon coating layer including molybdenum phosphide such as MoP and $MoP_2$ on the surface of the carbon-based material. In this case, the heat treatment may be performed in an inert gas atmosphere at 500 to 1,000° C. for 1 to 10 hours, and may be performed, for example, in a nitrogen gas atmosphere at 600° C. for 2 hours.

As described above, the anode active material according to the present invention may induce more stable movement of lithium ions without precipitation of lithium metal on the surface of the carbon-based material during high-rate charging by forming an amorphous carbon coating layer including molybdenum phosphide particles such as MoP and $MoP_2$ on the surface of the carbon-based material.

Alternatively, the reactivity and structural stability of the surface of the anode active material may be improved by introducing the functional coating layer, thereby suppressing precipitation of lithium metal and securing high-rate charging characteristics without deterioration of lifetime characteristics during high-rate charging when applying an amorphous carbon coating layer as the anode active material.

MODE FOR INVENTION

Example 1; Preparation of Anode Active Material

In order to evaluate lifetime characteristics and high-rate charging characteristics of a nonaqueous lithium secondary battery to which an anode active material was applied according to an exemplary embodiment of the present invention, an anode active material and a nonaqueous lithium secondary battery using the same were prepared. In this case, as a carbon-based material, artificial graphite having an average particle diameter of 17 μm was used. In the case of the comparative example, artificial graphite, in which a coating layer was not formed as the anode active material, was used. Moreover, since the nonaqueous lithium secondary batteries according to the examples and the comparative example are prepared in the same manner except for the anode active material, the method for preparing a nonaqueous lithium secondary battery according to the example will be mainly described.

First, in order to prepare an amorphous carbon coating layer containing molybdenum phosphide particles composed of MoP and $MoP_2$ on the surface of artificial graphite among carbon-based materials, coating solutions containing molybdenum phosphide particles composed of MoP and $MoP_2$ at a weight ratio of 10 wt % and 15 wt %, respectively were prepared after a 10 wt % weight ratio of coal tar pitch was dissolved in a THF solution.

Next, after the surface of artificial graphite was uniformly coated with the coating solution and dried at 600° C., an anode active material for a nonaqueous lithium secondary battery, including an amorphous carbon coating layer on the surface was finally prepared by a heat treatment at 600° C.

As shown in Table 1, in Comparative Example 1, among carbon-based materials, artificial graphite having a particle size of 20 μm or less, in which a coating layer was not formed, was used. Example 1 uses a material including a coating layer composed of 10 wt % of MoP and $MoP_2$ particles and 10 wt % of amorphous carbon on the surface of the artificial graphite according to Comparative Example 1, and Example 2 uses an artificial graphite including a coating layer composed of 15 wt % of MoP and $MoP_2$ particles and about 10 wt % of amorphous carbon on the surface of the artificial graphite according to Comparative Example 1.

size of several tens to several hundreds nanometers is formed on the surface of artificial graphite, unlike the Comparative Example.

Figure 4:
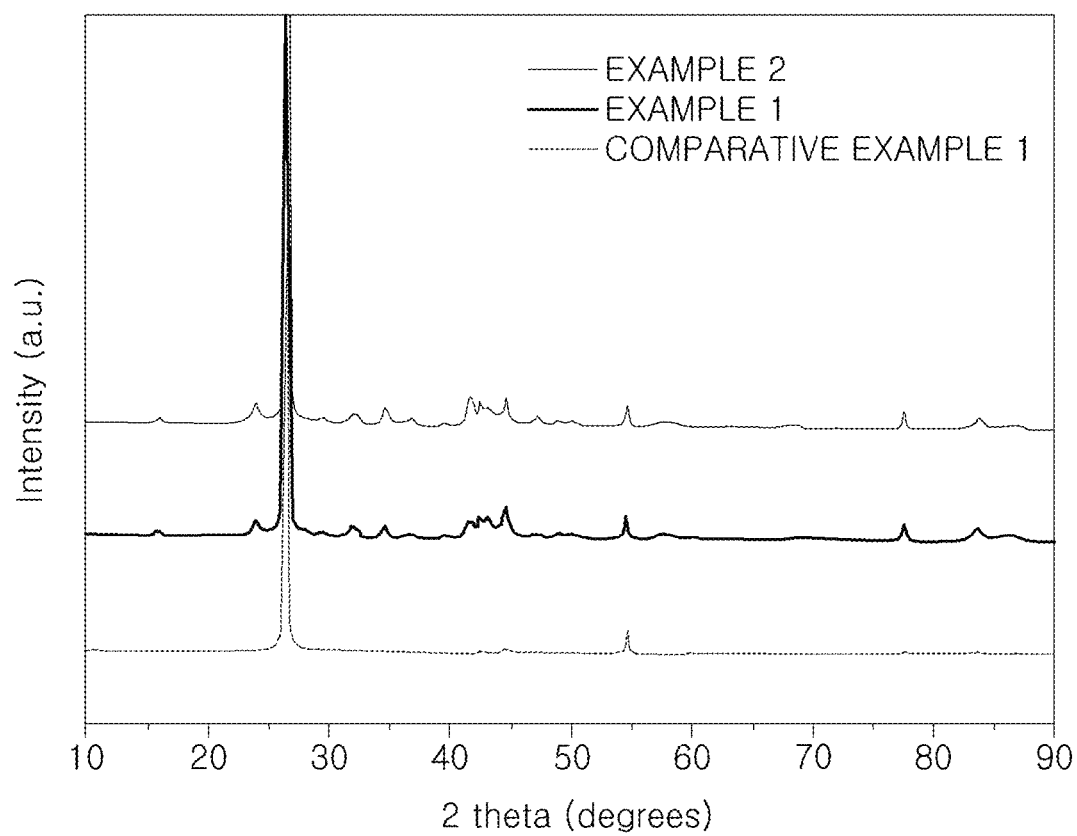
FIG. 4 illustrates a series of XRD patterns of the anode active materials according to the Examples and the Comparative Example of the present invention.

FIG. 4 is a graph illustrating X-ray diffraction (XRD) analysis results of the anode active materials according to the Examples and the Comparative Example of the present invention.

As illustrated in FIG. 4, it can be confirmed that as a result of XRD analyses, Comparative Example 1 and Examples 1 and 2 exhibit substantially different peak patterns. That is, in the case of the active materials prepared according to the Examples of the present invention, patterns corresponding to MoP and $MoP_2$ were observed when compared to the artificial graphite according to Comparative Example 1, and in the case of the Examples, as summarized in the following table, corresponding peaks can be observed in the vicinity of $2\theta=32.0°$ and $43.0°$, which are characteristic peaks of MoP, and corresponding peaks can be observed in the vicinity of $2\theta=23.9°$, $29.5°$, $41.7°$, $47.2°$, and $50.0°$, which are characteristic peaks of $MoP_2$.

TABLE 2

| Classification | Example 1 | Example 2 |
| --- | --- | --- |
| MoP | 31.91° | 31.93° |
|  | 43.15° | 43.15° |
| MoP2 | 23.84° | 23.94° |
|  | 29.41° | 29.47° |
|  | 41.66° | 41.74° |
|  | 47.19° | 47.27° |
|  | 50.04° | 50.02° |

TABLE 1

| Classification | Base material | Base material content | MoP/MoP2 Content | Coal tar pitch Content | Drying temperature | Heat treatment temperature |
| --- | --- | --- | --- | --- | --- | --- |
| Comparative Example 1 | Artificial graphite | 100% | — | — | — | — |
| Example 1 | Artificial graphite | 80 wt % | 10 wt % | 10 wt % | 100° C. | 600° C. |
| Example 2 | Artificial graphite | 75 wt % | 15 wt % | 10 wt % | 100° C. | 600° C. |

Figure 2B:
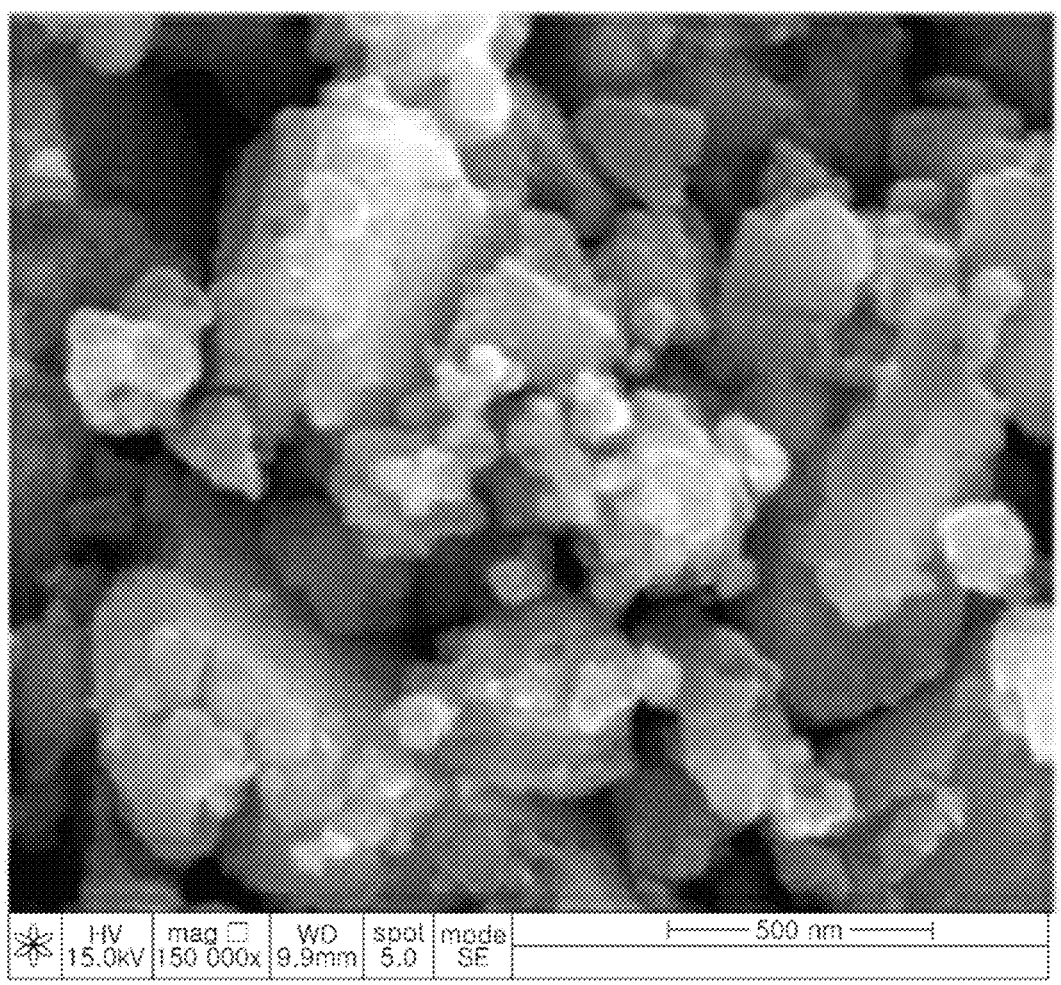
Figure 2C:
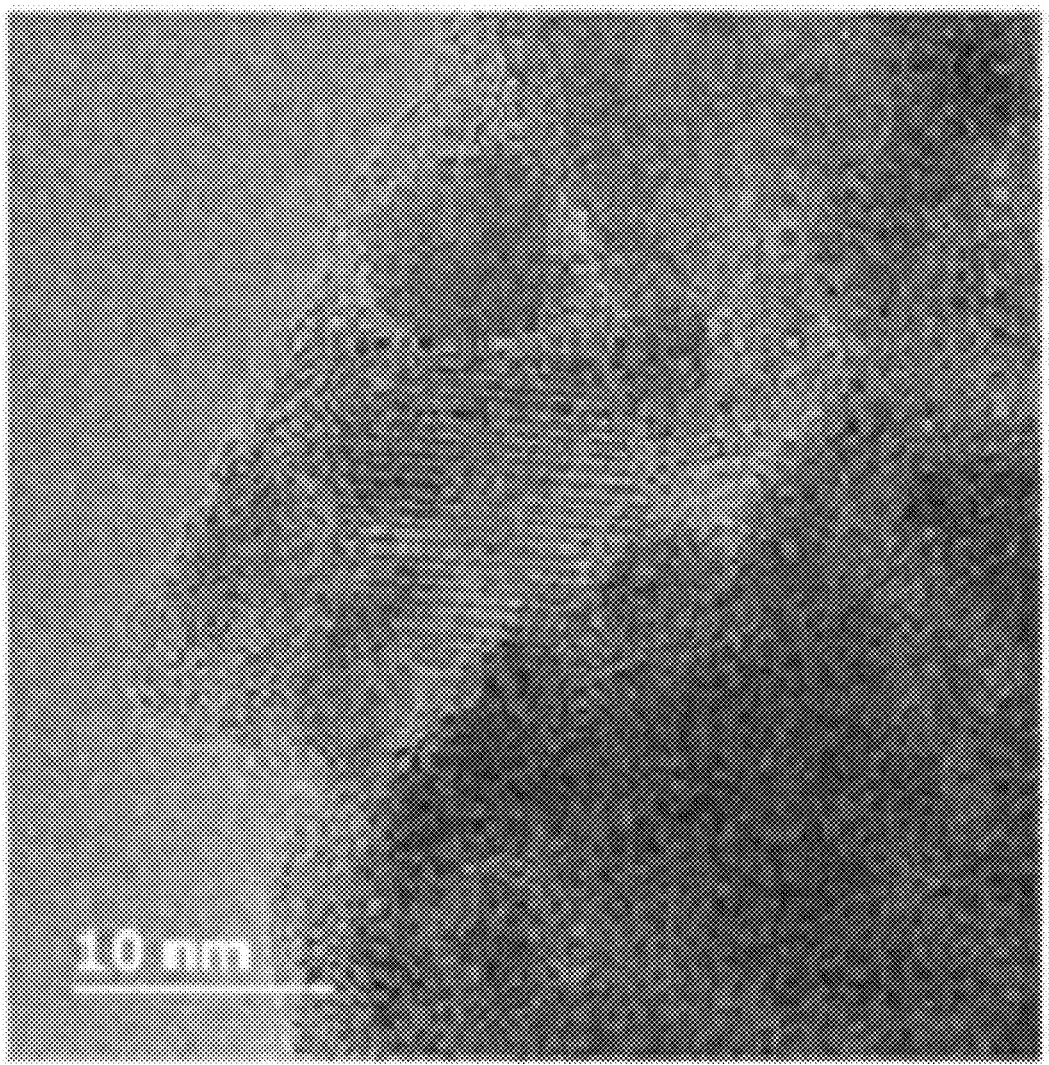
Figure 2D:
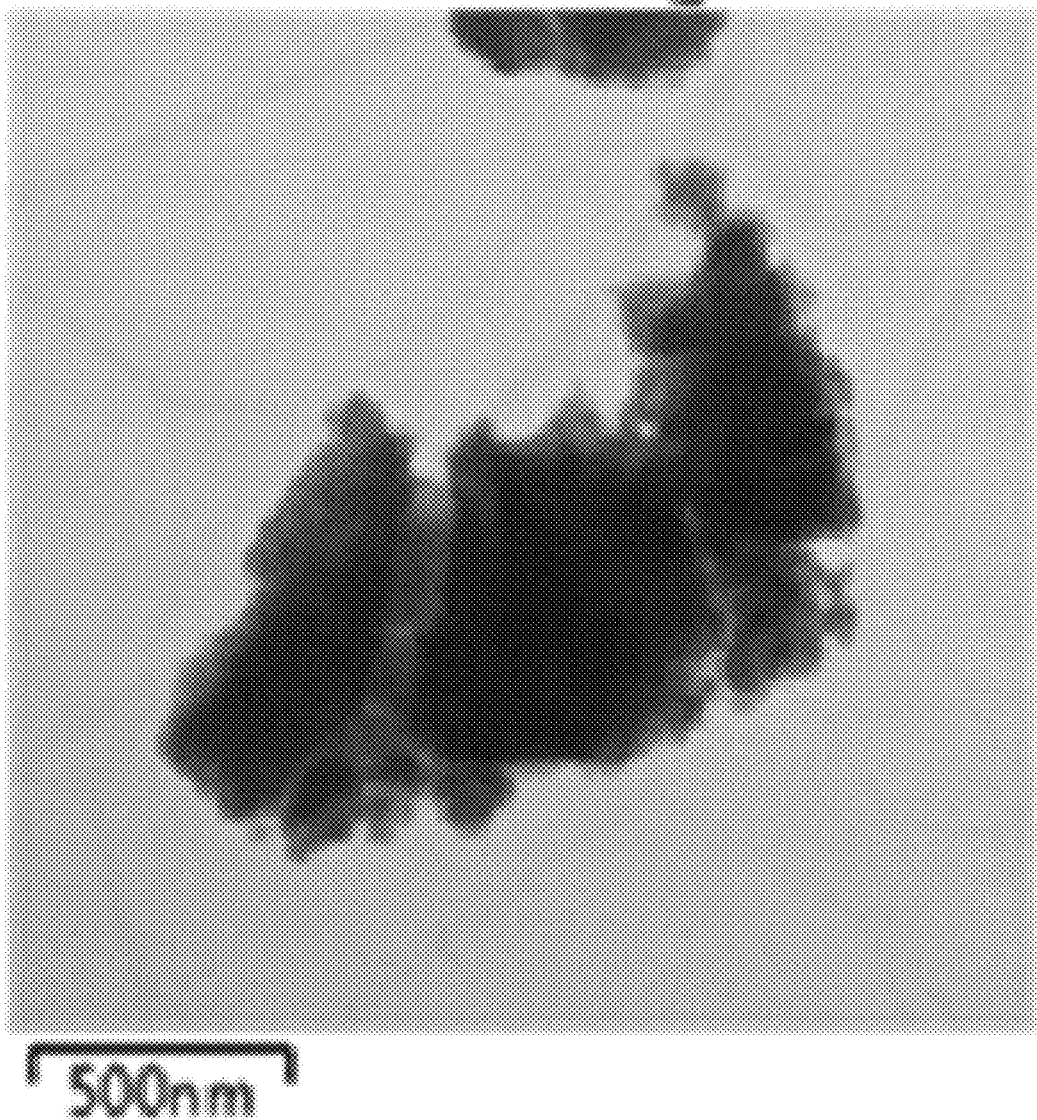
Figure 2E:
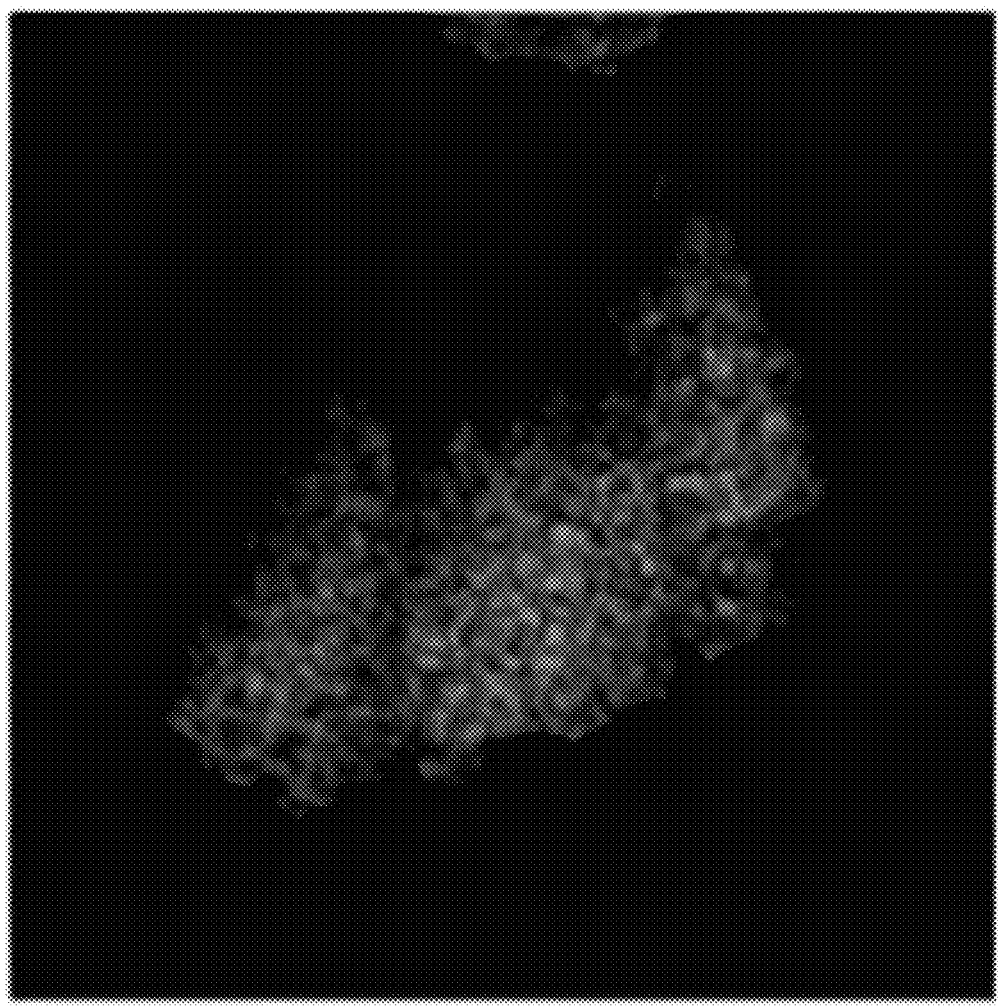
Figure 2F:
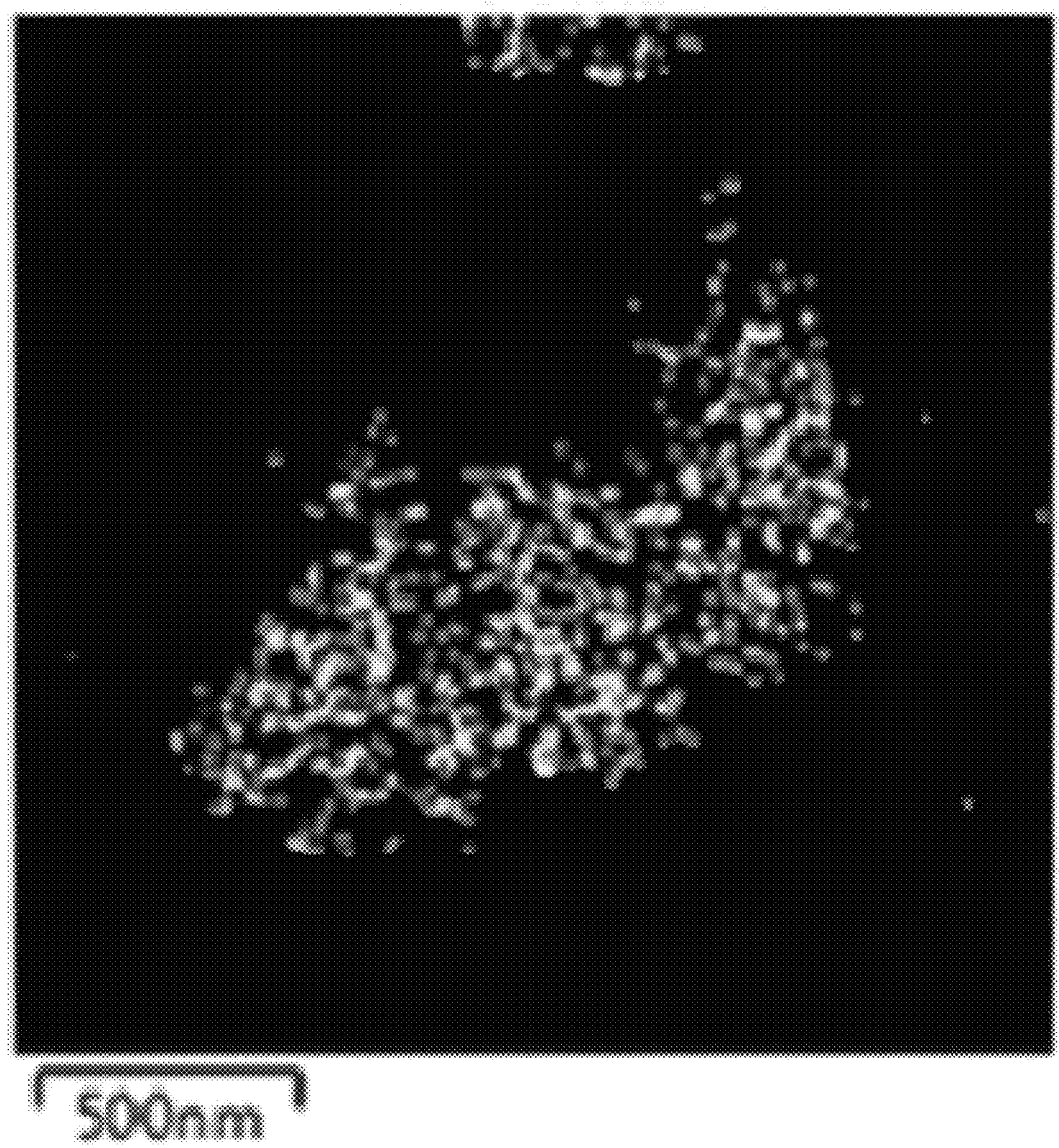

FIGS. 2A and 2B illustrate scanning electron microscope (SEM), and FIG. 2C and FIG. 2D illustrate transmission electron microscope (TEM), and FIGS. 2E and 2F energy dispersive spectroscopy (EDS) analysis results of anode active materials prepared according to Examples of the present invention.

Referring to FIGS. 2A to 2F, it can be seen that the formed molybdenum phosphide particles have a size of several tens to several hundreds nanometers, have an amorphous particle shape, and are composed of primary particles at a level of about 10 nanometers. As a result of EDS analysis, it may be confirmed that molybdenum phosphide particles are composed of molybdenum (Mo) and phosphorus (P).

Figure 3A:
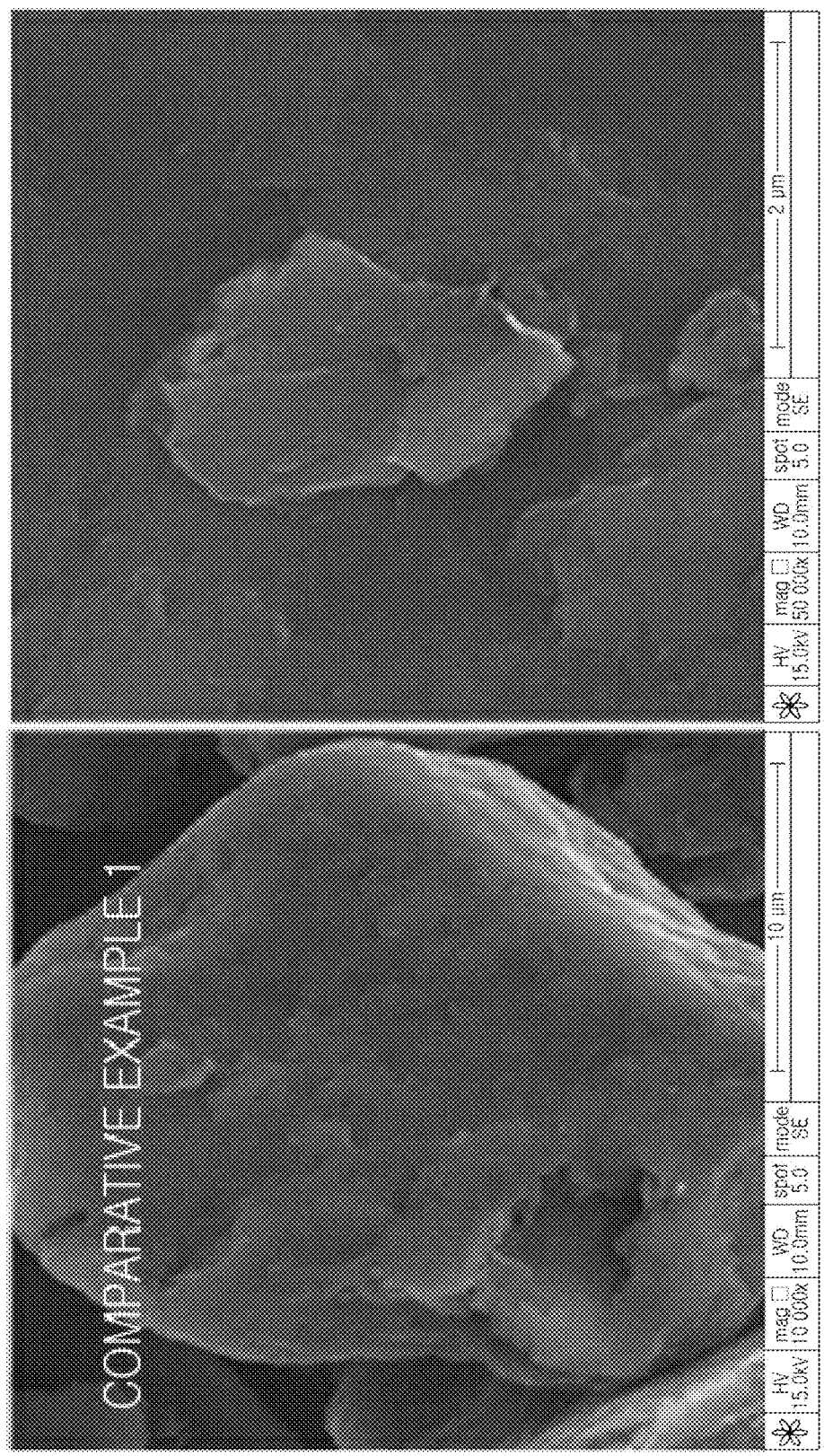
FIGS. 3A to 3C are a series of SEM photographs illustrating the anode active materials according to the Examples and the Comparative Example of the present invention.
Figure 3B:
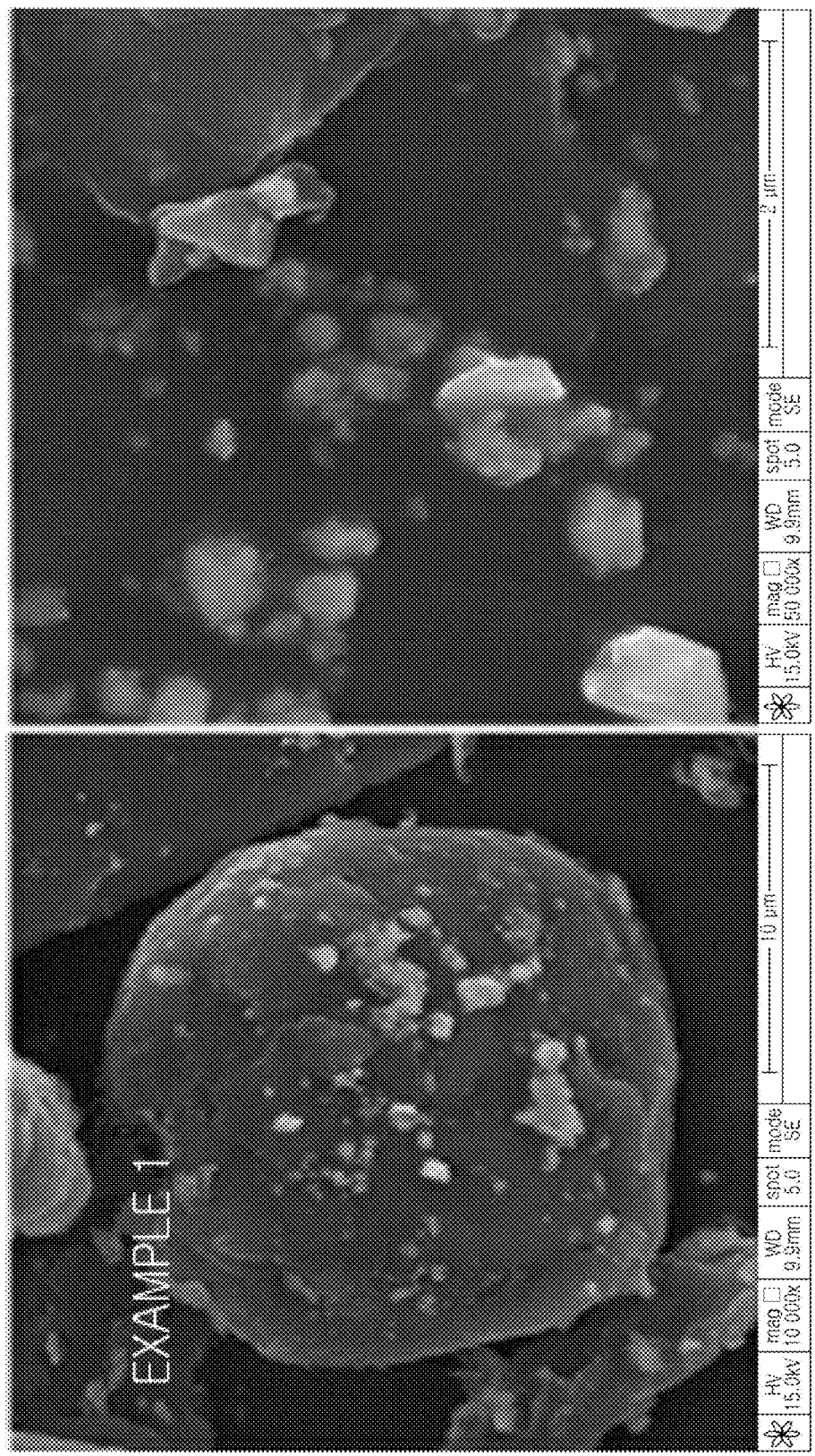
Figure 3C:
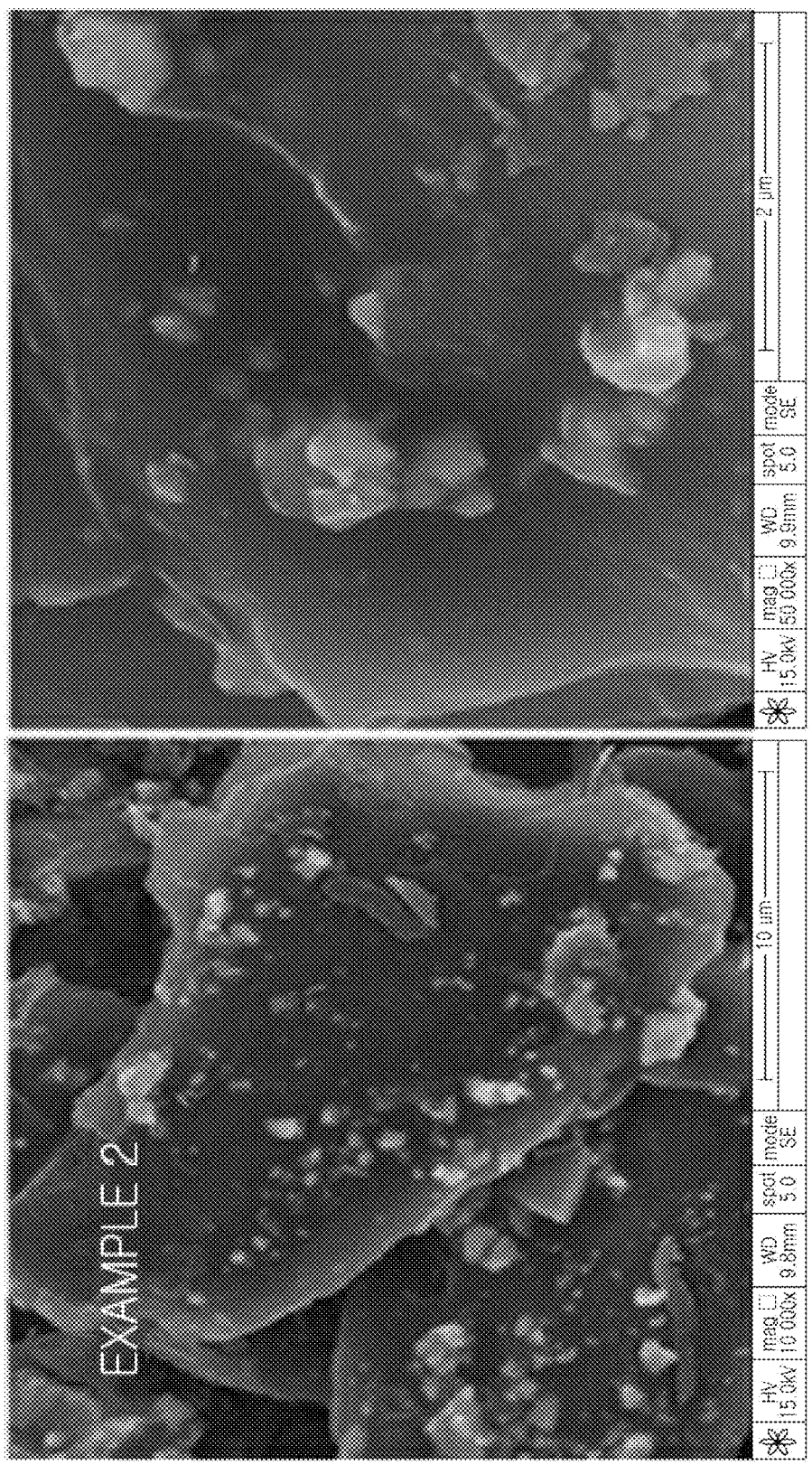

FIGS. 3A to 3C are a series of scanning electron microscope (SEM) photographs illustrating the anode active materials according to the Examples and the Comparative Example of the present invention.

Referring to FIGS. 3A to 3C, it can be seen that in the case of the Examples, an amorphous carbon coating layer containing particles composed of MoP and $MoP_2$, which have a Meanwhile, it can be confirmed that the formation of other impurities, or a change in average particle size and specific surface area is insignificant compared to Comparative Example 1.

Figure 5:
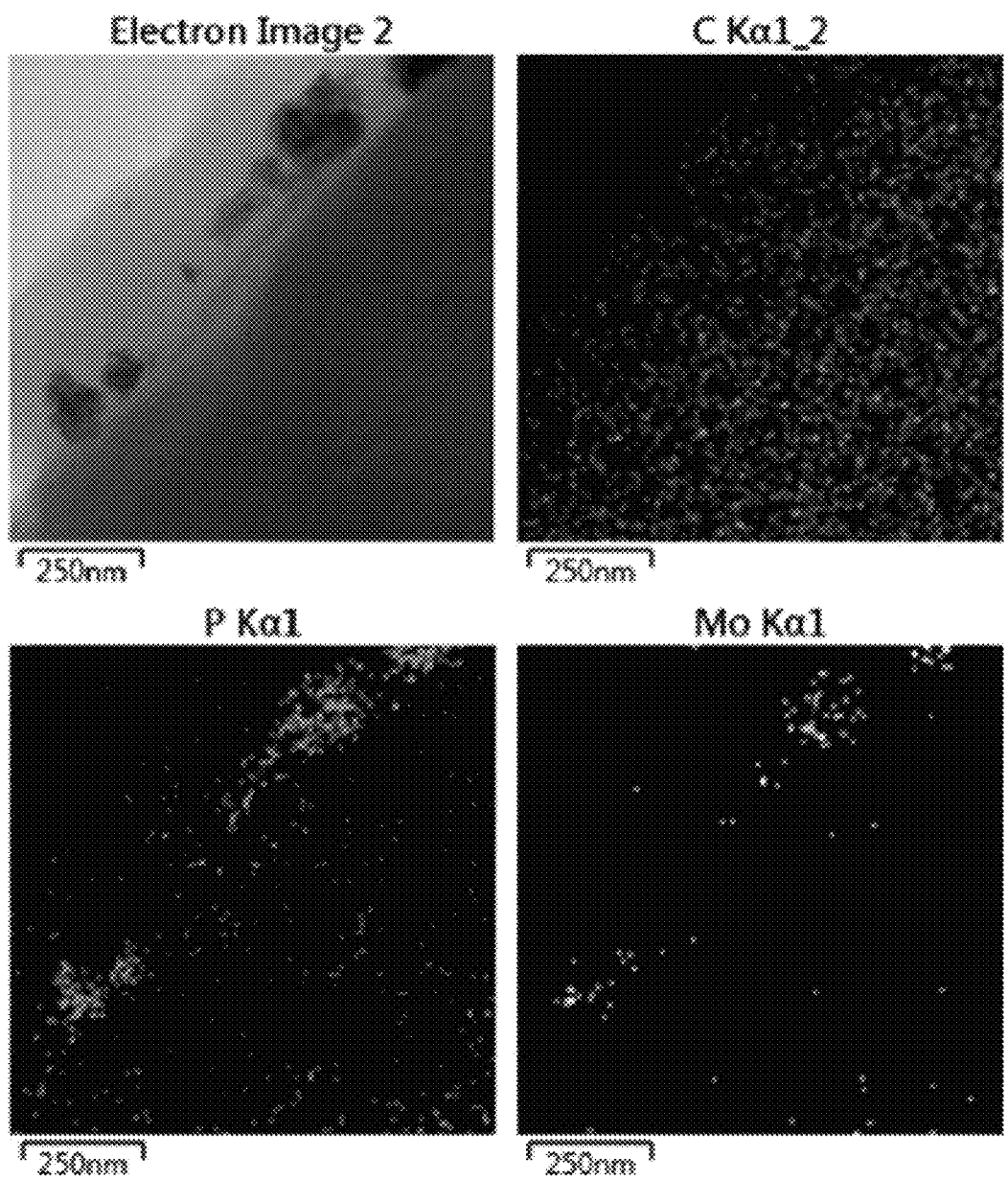
FIG. 5 is a series of TEM and EDS analysis result photographs capturing the anode active materials according to Example 2 of the present invention.

As in Examples 1 and 2 as described above, it could be confirmed through the energy dispersive spectroscopy (EDS) and transmission energy microscope (TEM) analysis results in FIGS. 3A to 3C, FIG. 4, and FIG. 5 that the artificial graphite coated with an amorphous carbon including MoP and $MoP_2$ particles included MoP and $MoP_2$ particles on the surface. Here, FIG. 5 is a series of transmission electron microscope (TEM) and energy dispersive spectroscopy (EDS) photographs showing the anode active materials according to Example 2 of the present invention, and it can be confirmed that in the coating layer, an amorphous carbon coating layer including MoP and $MoP_2$ particles is formed on the surface of artificial graphite. This suggests that MoP and $MoP_2$ particles form a physical or chemical bond with amorphous carbon on the surface of artificial graphite.

Example 2; Preparation of Secondary Battery

Nonaqueous lithium secondary batteries were prepared using the anode active materials prepared according to the Examples and the Comparative Examples as described above.

First, a slurry was prepared using 96 wt % of an anode active material, 4 wt % of a binder polyvinylidene fluoride (PVDF), and N-methyl-2-pyrrolidone (NMP) as a solvent. An electrode was manufactured by coating a copper foil with the slurry, and then drying the copper foil. In this case, the loading level and the mixture density of the electrode were 5 mg/cm$^2$ and 1.5 g/cc, respectively. Electrochemical characteristics were evaluated after a half cell was manufactured using a lithium metal counter electrode, and 1 M LiPF6 in EC/EMC was used as an electrolyte.

Figure 6:
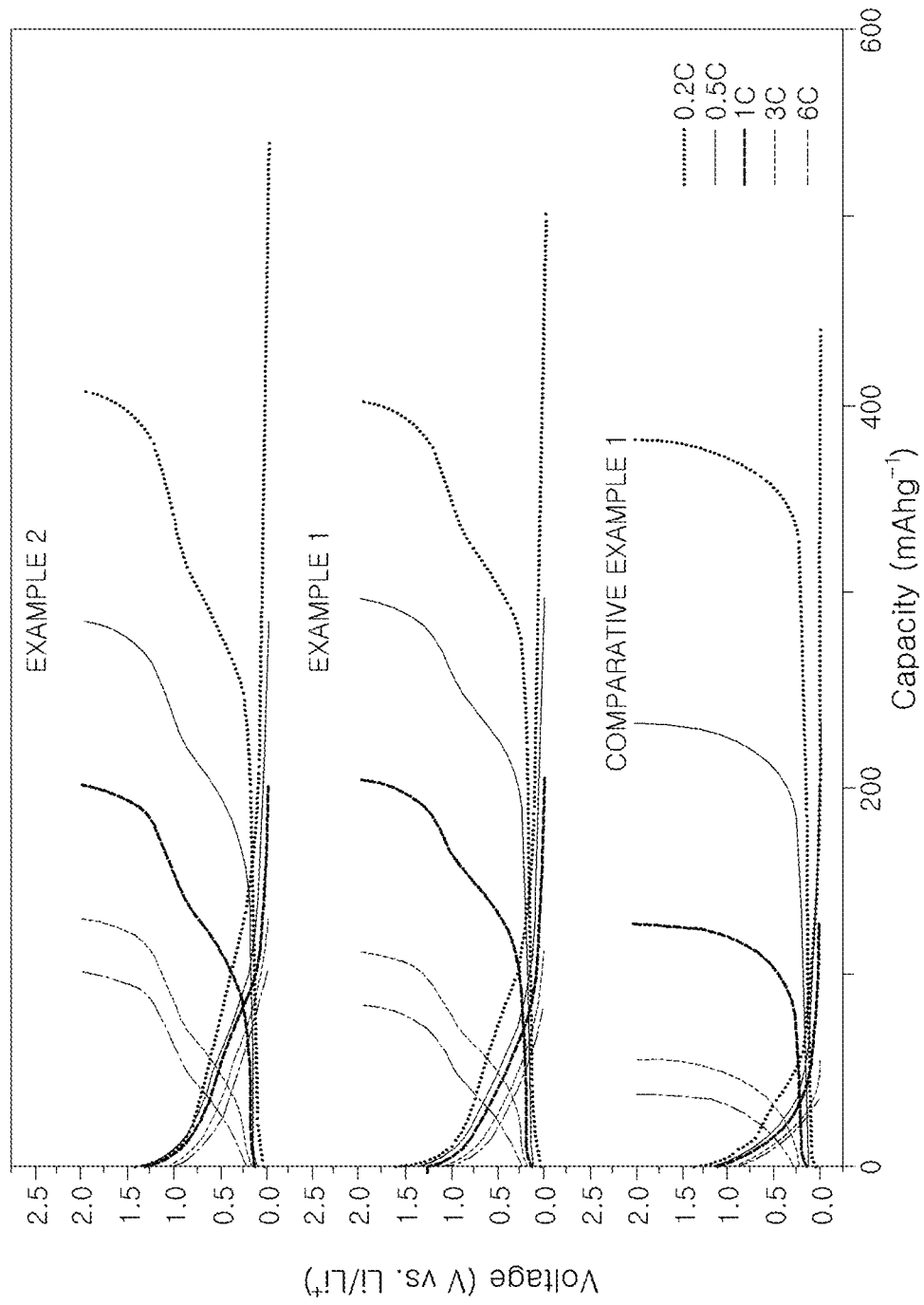
FIG. 6 is a graph illustrating half cell charging and discharging characteristics of nonaqueous lithium secondary batteries using the anode active materials according to the Examples and the Comparative Example of the present invention.

The results of evaluating the charging and discharging characteristics of the nonaqueous lithium secondary batteries according to the Examples and the Comparative Example are shown in FIG. 6. Here, FIG. 7 is a graph illustrating charging characteristics of nonaqueous lithium secondary batteries using the anode active materials according to the Examples and the Comparative Example of the present invention at each ratio.

The lifetime of each of the Comparative Examples and the Examples was evaluated by performing charging and discharging three times with a constant current of 0.2 C (70 mA/g), and then charging with a constant current of 0.5 C (175 mA/g), 1 C (350 mA/g), 3 C (1050 mA/g), and 6 C (2100 mA/g), and then discharging with constant current of 1 C (350 mA/g) in 0.01 to 2.0 V vs. a Li/Li$^+$ potential region, and the results are illustrated in FIG. 6.

Figure 7:
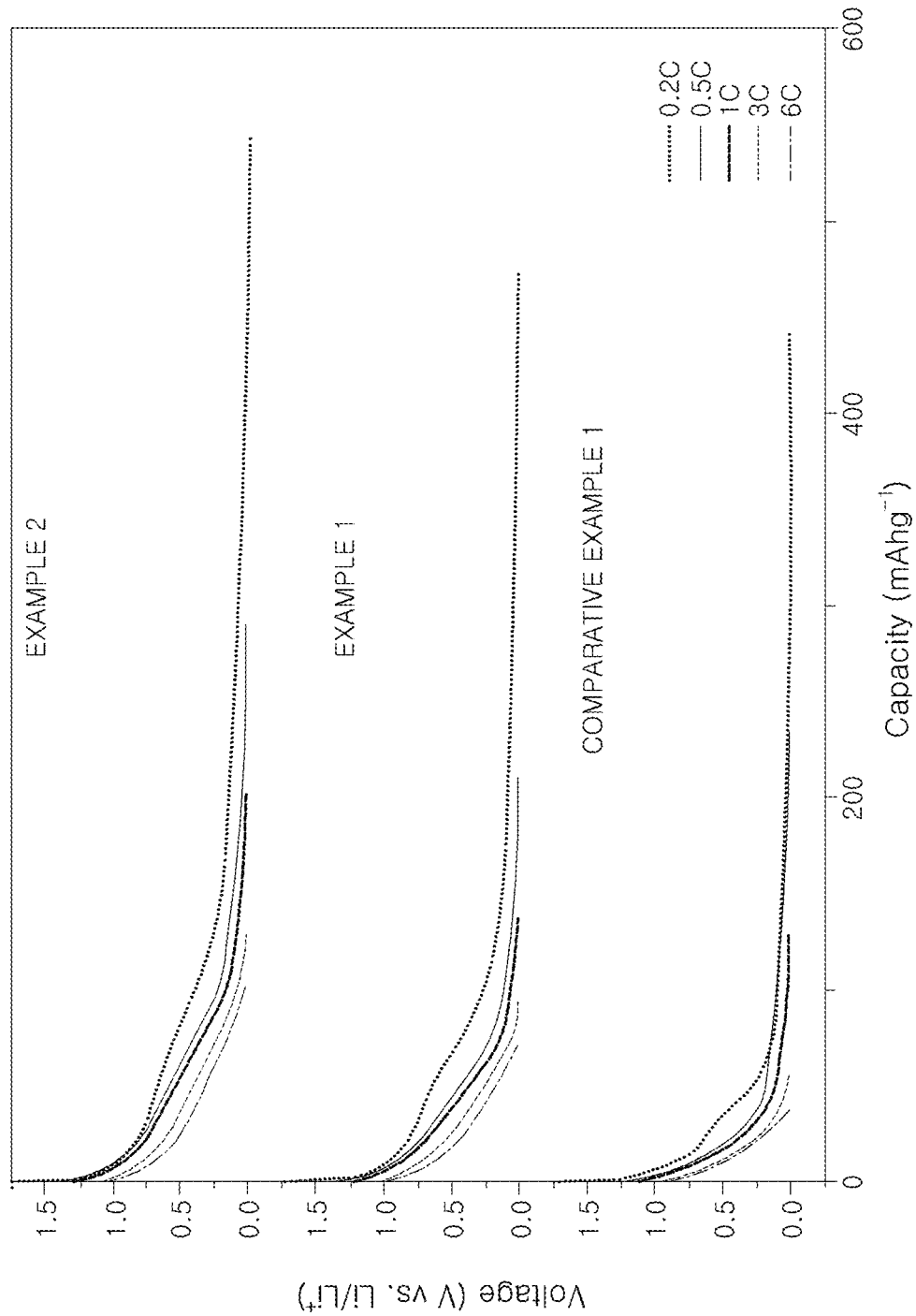
FIG. 7 is a graph comparing charging characteristics of nonaqueous lithium secondary batteries using the anode active materials according to the Examples and the Comparative Example of the present invention at each half cell ratio.

Referring to FIG. 7, it can be confirmed that in Examples 1 and 2 in which an amorphous carbon coating layer including MoP and MoP$_2$ particles is formed, charging capacity and high-rate charging characteristics are improved compared to Comparative Example 1. Through the introduction of an amorphous carbon coating layer including MoPx particles composed of MoP and MoP$_2$ on the surface of artificial graphite, it is determined that high-rate charging characteristics are improved by effectively reducing resistance when intercalating lithium ions into the surface of artificial graphite and inducing more stable movement of lithium ions during high-rate charging.

Figure 8:
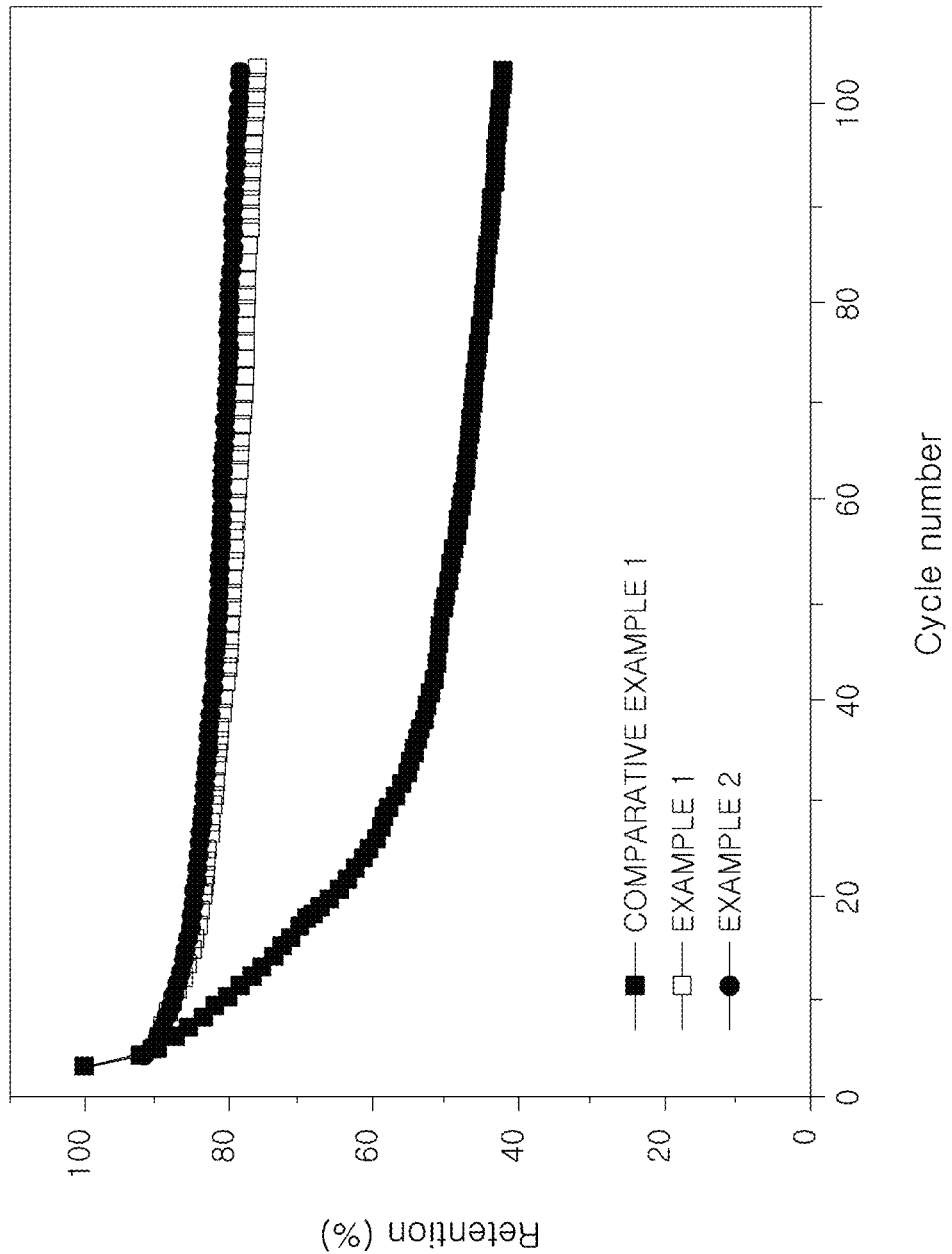
FIG. 8 is a graph illustrating full cell lifetime characteristics of nonaqueous lithium secondary batteries using the anode active materials according to the Examples and the Comparative Example of the present invention.

The results of evaluating the full cell lifetime characteristics of the nonaqueous lithium secondary batteries according to the Examples and the Comparative Example are shown in FIG. 8. By using an NCM622 material as the cathode and preparing the corresponding anodes in Comparative Example 1 and Example 2, charging and discharging was performed three times with a constant current of 0.2 C (70 mA/g), and then charging was performed with a constant current of 6 C (2100 mA/g), and then discharging was performed 100 times with a constant current of 1 C (350 mA/g) in a 2.5 to 4.3 V vs. Li/Li$^+$ potential region, and the results are illustrated in FIG. 8. Here, FIG. 8 is a graph comparing full cell lifetime characteristics of nonaqueous lithium secondary batteries using the anode active materials according to the Examples and the Comparative Example of the present invention.

Figure 9:
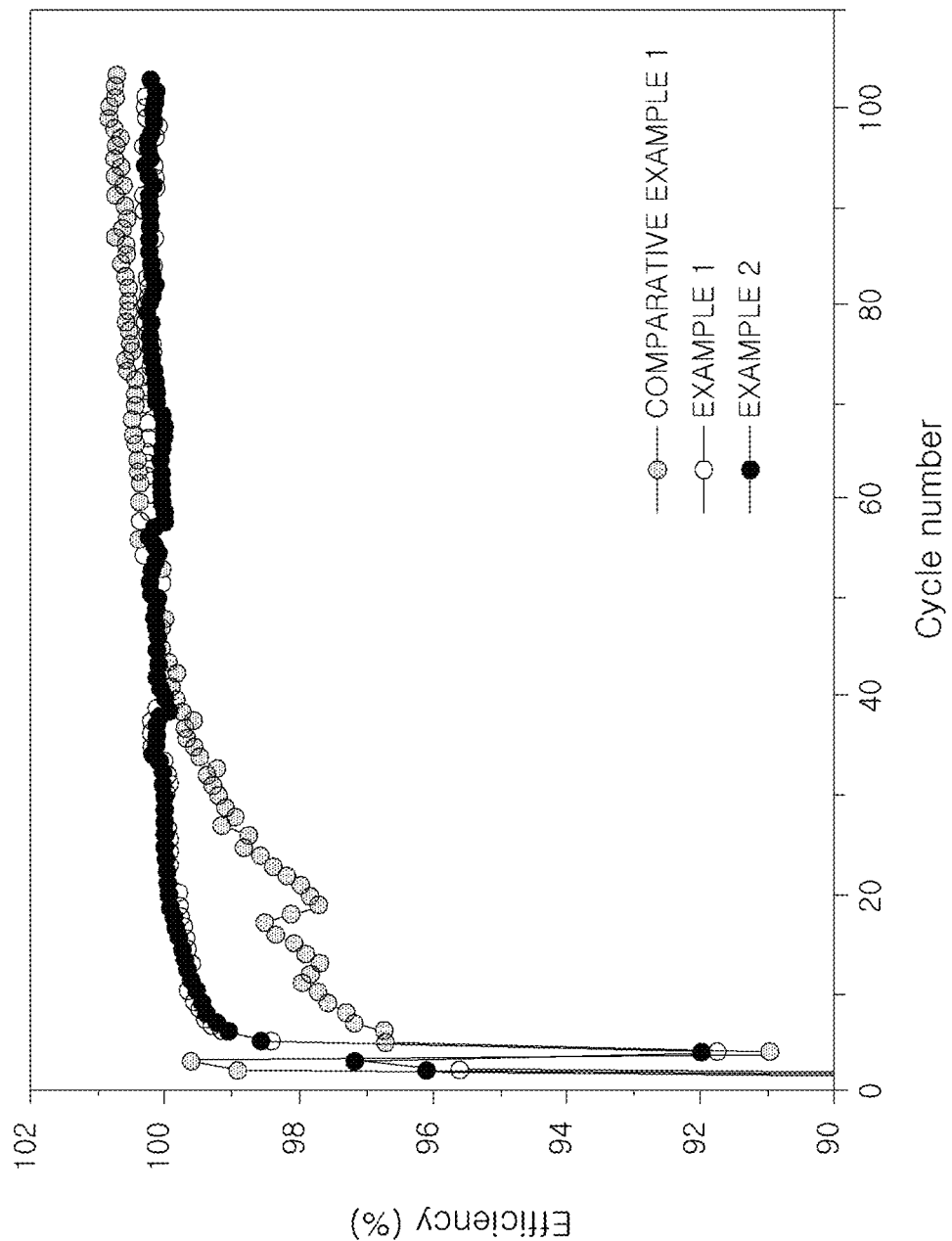
FIG. 9 is a graph illustrating full cell charging and discharging efficiency characteristics of nonaqueous lithium secondary batteries using the anode active materials according to the Examples and the Comparative Example of the present invention.

Referring to FIG. 8, Example 1 and Example 2 show relatively excellent water capacity retention rate during high-rate charging and discharging, and the charging and discharging efficiency results illustrated in FIG. 9 also show the improved characteristics. This means that the high-rate charging characteristics in Examples 1 and 2 in which an amorphous carbon coating layer including MoPx particles composed of MoP and MoP$_2$ is introduced are improved.

The results of evaluating the full cell charging times of the nonaqueous lithium secondary batteries according to the Examples and the Comparative Example are shown in FIG. 10. Here, FIG. 10 is a graph comparing fill cell charging times of the nonaqueous lithium secondary batteries using the anode active materials according to the Examples and the Comparative Example of the present invention.

Referring to FIG. 10, it was confirmed that the full cells of the nonaqueous lithium secondary batteries to which Examples 1 and 2 were applied were charged in a shorter period of time than in the Comparative Example, and it was confirmed that the charging time was shortened as the content of MoPx particles was increased. This suggests that MoPx particles serve to effectively reduce resistance when intercalating lithium ions.

Figure 11A:
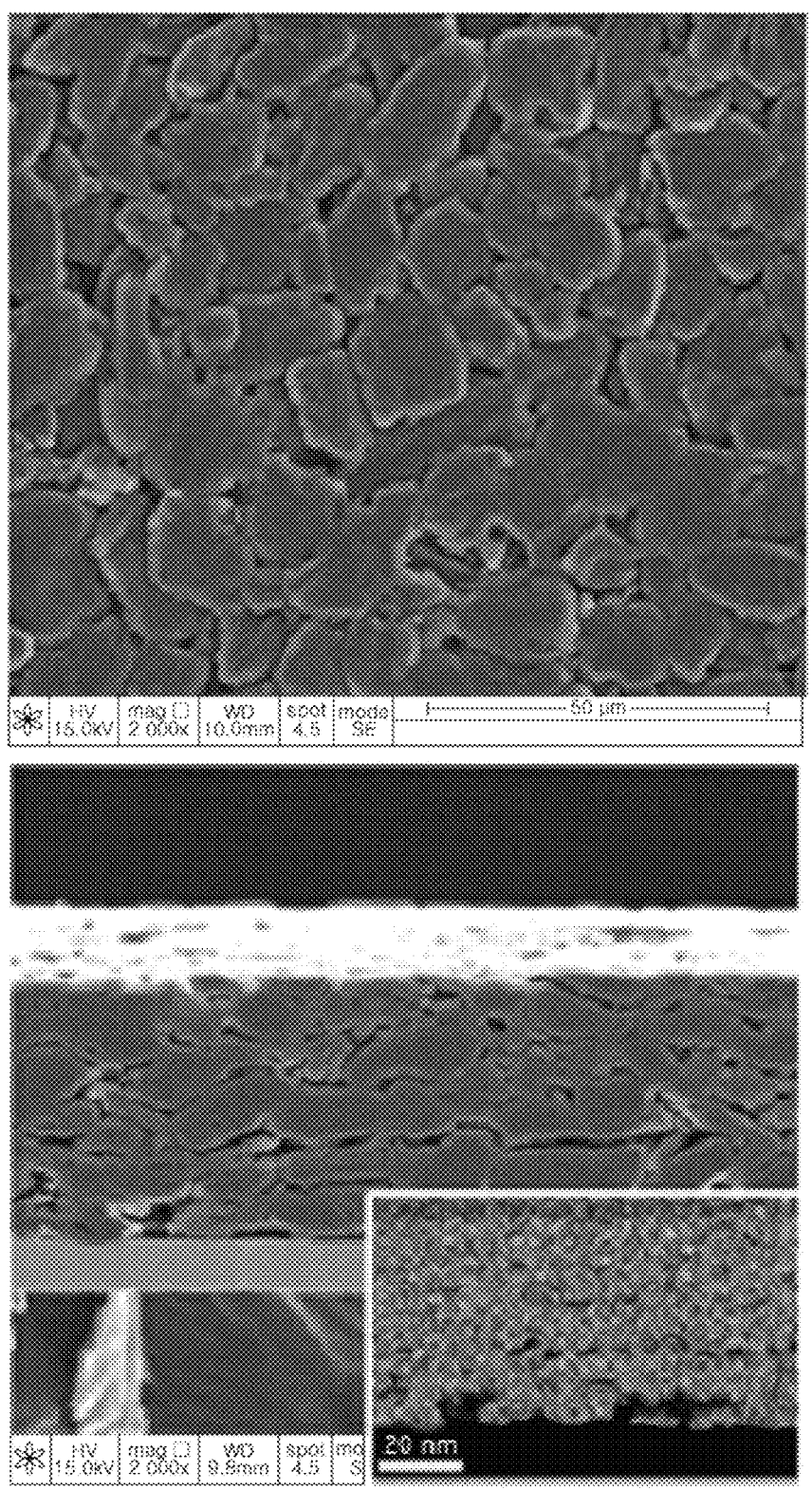
Figure 11B:
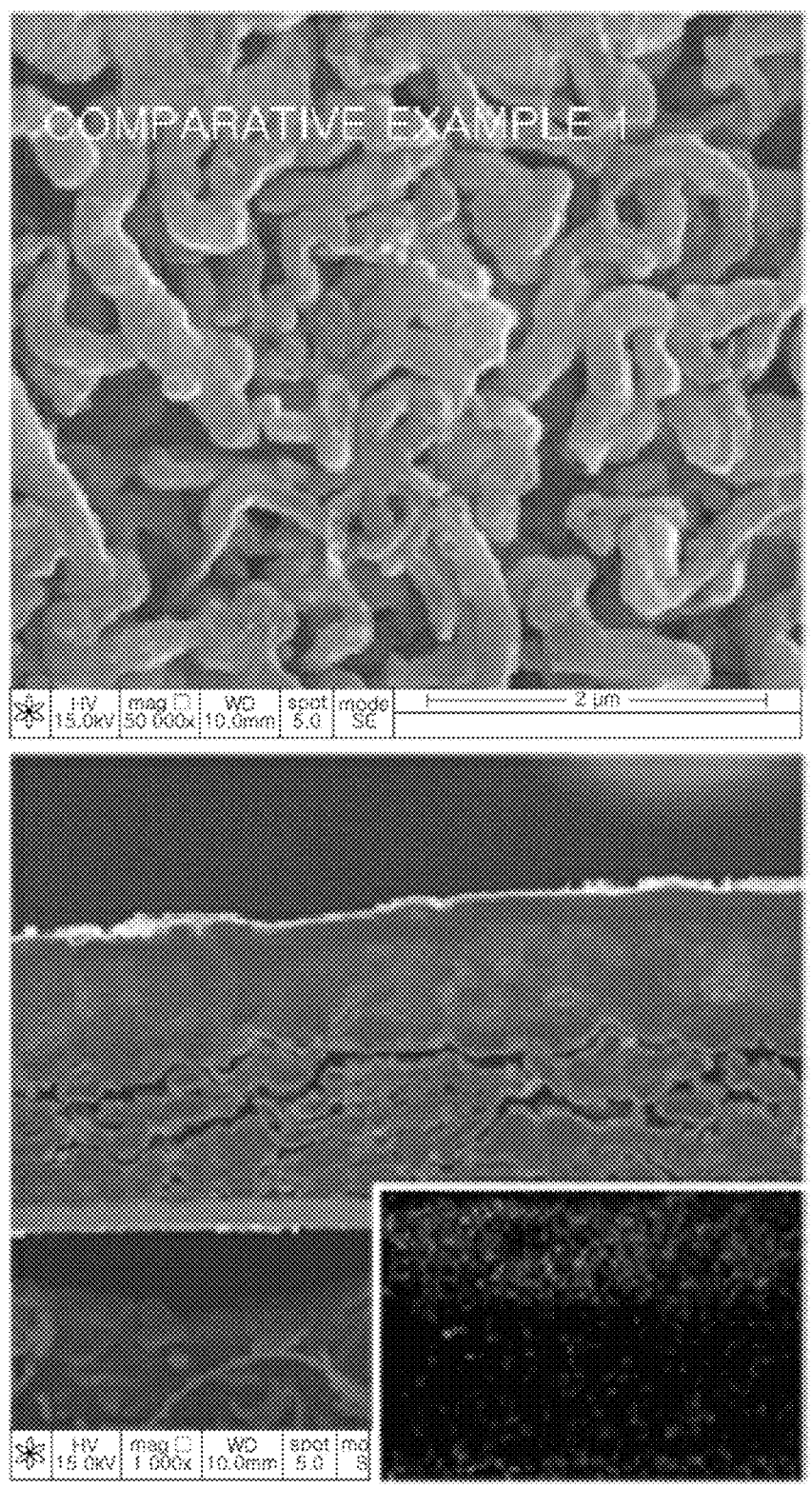

Moreover, the analysis results of the surface and cross-section of the electrode after the lifetime characteristics of the nonaqueous lithium secondary batteries according to the Examples and the Comparative Example were evaluated are shown in FIGS. 11A to 11C. Here, FIGS. 11B to 11C illustrate scanning electron microscope (SEM) analysis results after lifetime characteristics of the nonaqueous lithium secondary batteries using the anode active materials according to the Examples and the Comparative Example of the present invention are evaluated.

Referring to FIGS. 11A to 11B, after the evaluation of lifetime characteristics, it can be confirmed that in the case of Comparative Example 1, lithium metal is precipitated on the surface of the electrode, but as shown in FIG. 11C it is determined that in the case of Example 2, the precipitation of lithium metal is insignificant. This suggests that the aforementioned high-rate charging characteristics are improved.

Meanwhile, the exemplary embodiments disclosed in the present specification and the drawings merely suggest specific examples for the purpose of better understanding, and are not intended to limit the scope of the present invention. It is obvious to those with ordinary skill in the art to which the present invention pertains that other modified exemplary embodiments based on the technical idea of the present invention can be implemented in addition to the exemplary embodiment disclosed herein.

INDUSTRIAL APPLICABILITY

The present invention can be applied to a lithium secondary battery.

The invention claimed is:

1. An anode active material for a nonaqueous lithium secondary battery, comprising:
a carbon-based material; and
an amorphous carbon coating layer comprising a metal phosphide formed on the surface of the carbon-based material,
wherein the metal of the metal phosphide comprises at least one selected from the group consisting of Mo, Ni, Fe, Co, Ti, V, Cr, and Mn.

2. The anode active material of claim 1, wherein the metal comprises Mo, and comprises at least one of compounds consisting of MoP, MoP$_2$, Mo$_3$P, MoP$_4$, Mo$_4$P$_3$, and Mo$_8$P$_5$.

3. The anode active material of claim 1, wherein the coating layer is a compound containing the MoP and MoP$_2$ particles and amorphous carbon formed on the surface of the carbon-based material through heat treatment of MoP and $MoP_2$ and at least one material selected from the group consisting of coal tar pitch, petroleum coke, plastic resins, and pyrocarbon.

4. The anode active material of claim 3, wherein in the coating layer, an amount of MoPx composed of MoP and $MoP_2$ is 50 wt % or less.

5. The anode active material of claim 1, wherein the anode active material has characteristic peaks in the vicinity of 2θ=32.0° and 43.0° in an X-ray diffraction pattern.

6. The anode active material of claim 1, wherein the anode active material has characteristic peaks in the vicinity of 2θ=23.9°, 29.5°, and 41.7° in an X-ray diffraction pattern.

7. The anode active material of claim 1, wherein the coating layer is uniformly or partially formed on the surface of the carbon-based material.

8. The anode active material of claim 1, wherein the carbon-based material comprises at least one selected from the group consisting of artificial graphite, natural graphite, graphitized carbon fiber, graphitized mesocarbon microbeads, petroleum coke, plastic resins, carbon fiber, and pyrocarbon.

9. The anode active material of claim 8, wherein the carbon-based material has a particle size of 20 μm or less.

10. A nonaqueous lithium secondary battery comprising an anode comprising the anode active material of claim 1.

11. A method for preparing an anode active material for a nonaqueous lithium secondary battery, the method comprising:
preparing a carbon-based material; and
forming an amorphous carbon coating layer comprising a metal phosphide on the surface of the carbon-based material,
wherein the metal of the metal phosphide comprises at least one selected from the group consisting of Mo, Ni, Fe, Co, Ti, V, Cr, and Mn.

12. The method of claim 11, wherein the forming of the amorphous carbon coating layer comprises:
coating the surface of the carbon-based material with the amorphous carbon precursor solution by mixing an amorphous carbon precursor solution containing the metal and P with the carbon-based material;
drying the carbon-based material coated with the amorphous carbon precursor solution; and
forming an amorphous carbon coating layer containing molybdenum phosphide by heat-treating the dried carbon-based material.

13. The method of claim 12, wherein the amorphous carbon precursor comprises at least one selected from the group consisting of coal tar pitch, petroleum coke, plastic resins, and pyrocarbon.

14. The method of claim 12, wherein the metal comprises Mo, and Mo and P contained in the amorphous carbon precursor in the coating step are molybdenum phosphide.

15. The method of claim 14, wherein the molybdenum phosphide comprises at least one of compounds consisting of MoP, $MoP_2$, $Mo_3P$, $MoP_4$, $Mo_4P_3$, and $Mo_8P_5$.

16. The method of claim 15, wherein the molybdenum phosphide is a mixture of MoP and $MoP_2$, the amorphous carbon precursor solution is a coal tar pitch solution, and the molybdenum phosphide is included in an amount of 0 to 50 wt % in the amorphous carbon precursor solution.

17. The method of claim 16, wherein the drying step is performed at room temperature to 100° C.

18. The method of claim 16, wherein the heat treatment step is performed in an inert gas atmosphere at 500 to 1000° C. for 1 to 10 hours.

* * * * *